(12) United States Patent
Yoshida et al.

(10) Patent No.: US 8,334,956 B2
(45) Date of Patent: Dec. 18, 2012

(54) LIQUID CRYSTAL DEVICE AND ELECTRONIC APPARATUS

(75) Inventors: Shuhei Yoshida, Tottori (JP); Keiji Takizawa, Tottori (JP)

(73) Assignee: Sony Corporation, Tokyo (JP)

( * ) Notice: Subject to any disclaimer, the term of this patent is extended or adjusted under 35 U.S.C. 154(b) by 199 days.

(21) Appl. No.: 12/877,402

(22) Filed: Sep. 8, 2010

(65) Prior Publication Data

US 2011/0063548 A1 Mar. 17, 2011

(30) Foreign Application Priority Data

Sep. 15, 2009 (JP) ................................. 2009-212985

(51) Int. Cl.
*G02F 1/1343* (2006.01)
(52) U.S. Cl. ........................................................ 349/141
(58) Field of Classification Search .................... 349/141
See application file for complete search history.

(56) References Cited

U.S. PATENT DOCUMENTS 6,100,956 A * 8/2000 Oh-e et al. ..................... 349/141
6,346,932 B1 2/2002 Maeda

FOREIGN PATENT DOCUMENTS

JP 8-122803 5/1996
JP 2001-51263 2/2001

* cited by examiner

*Primary Examiner* — James Dudek
(74) *Attorney, Agent, or Firm* — K&L Gates LLP (57) ABSTRACT

A liquid crystal device includes: a first substrate; a second substrate; a liquid crystal layer sandwiched between the first substrate and the second substrate; a first electrode and a second electrode disposed on a side of the first substrate facing the liquid crystal layer; and a color filter and an electrostatic shielding layer disposed on a side of the second substrate facing the liquid crystal layer, the color filter including coloring layers of at least three different colors, the electrostatic shielding layer having an aperture formed therein corresponding to the coloring layer of at least one of the three different colors.

7 Claims, 9 Drawing Sheets

INCIDENT LIGHT

| | COMPARATIVE EXAMPLE 1 | COMPARATIVE EXAMPLE 2 | EXAMPLE 1 | EXAMPLE 2 | EXAMPLE 3 | EXAMPLE 4 | EXAMPLE 5 | EXAMPLE 6 |
|---|---|---|---|---|---|---|---|---|
| PRESENCE/ABSENCE OF APERTURE | ABSENT | ABSENT | PRESENT | PRESENT | PRESENT | PRESENT | PRESENT | PRESENT |
| THICKNESS OF SHIELD ELECTRODE (nm) | 150 | 30 | 150 | 150 | 150 | 150 | 150 | 30 |
| THICKNESS OF OVC LAYER ($\mu$m) | 3.0 | 3.0 | 1.0 | 2.0 | 3.0 | 4.0 | 5.0 | 3.0 |
| x | 0.300 | 0.299 | 0.297 | 0.297 | 0.298 | 0.298 | 0.298 | 0.297 |
| y | 0.293 | 0.291 | 0.288 | 0.289 | 0.290 | 0.290 | 0.290 | 0.288 |

LIQUID CRYSTAL DEVICE AND ELECTRONIC APPARATUS

CROSS REFERENCES TO RELATED APPLICATIONS

The present application claims priority to Japanese Priority Patent Application JP 2009-212985 filed in the Japan Patent Office on Sep. 15, 2009, the entire contents of which is hereby incorporated by reference.

BACKGROUND

The present application relates to a liquid crystal device and an electronic apparatus including the same.

As the liquid crystal device, there is a known liquid crystal device configured to generate an electric field between a pixel electrode and a common electrode disposed on one of a pair of substrates, the electric field being parallel to the substrate surface, so as to drive liquid crystals. The liquid crystal device is also configured to apply a fixed potential to a transparent conductive film disposed on the outer surface of the other substrate (JP-A-2001-51263 (Patent Document 1)).

The liquid crystal device of Patent Document 1 is described to apply a fixed potential to the transparent conductive film so as to make the other substrate less susceptible to static build-up, whereby the disruption of the alignment of liquid crystal molecules due to static charge can be prevented, achieving a high-definition display.

For the purpose of achieving a high-definition display, there is a known color liquid crystal display device including a first substrate having a first electrode, a second substrate having a color filter and a second electrode for covering the color filter, and liquid crystals sealed between the substrates, wherein at least either the first electrode or the second electrode is formed to have a thickness different according to a color of the color filter opposed thereto (JP-A-8-122803 (Patent Document 2)).

The color liquid crystal display device of Patent Document 2 is described to have at least either the first electrode or the second electrode being formed to have a thickness different according to a color of the color filter opposed thereto, whereby the transmittance of light transmitted through the color filter can be adjusted, achieving an image display with excellent color balance.

SUMMARY

In order to apply the technical thoughts of Patent Document 2 to the liquid crystal device of Patent Document 1, it is necessary to dispose a color filter on one substrate. Further, the thickness of the pixel electrode or the common electrode on the other substrate opposed to the one substrate should be varied according to a color of the color filter.

However, this is problematic in that the thickness of the liquid crystal layer sandwiched between one and the other substrates varies for each color of the color filter, resulting in variations in response speed.

Another problem is that when light transmitted through the color filter passes through the transparent conductive film disposed on the other substrate, the hue or the color balance of the actual display deviates from the optically optimized conditions.

Thus, it is desirable to solve at least a part of the problems mentioned above.

An embodiment is directed to a liquid crystal device including a first substrate; a second substrate; a liquid crystal layer sandwiched between the first substrate and the second substrate; a first electrode and a second electrode disposed on a side of the first substrate facing the liquid crystal layer; and a color filter and an electrostatic shielding layer disposed on a side of the second substrate facing the liquid crystal layer, the color filter including coloring layers of at least three different colors. The electrostatic shielding layer has an aperture formed therein corresponding to the coloring layer of at least one of the three different colors.

In this configuration, the electrostatic shielding layer is disposed on the side of the second substrate facing the liquid crystal layer. This suppresses the disruption of the alignment of liquid crystal molecules in the liquid crystal layer due to static charge on the second substrate. Further, light transmitted through a coloring layer at the aperture in the electrostatic shielding layer is rarely influenced by the electrostatic shielding layer. Therefore, the original hue and chroma of the coloring layer are faithfully recreated. That is, it is possible to provide a liquid crystal device that has reduced sensitivity to static charge and produces a display of colors adjusted with less influence on optical properties such as a response speed.

In the above liquid crystal device, it is preferable that the coloring filters have coloring layers of red, green, and blue, and the aperture in the electrostatic shielding layer is formed corresponding to the coloring layer of blue.

In this configuration, because the aperture in the electrostatic shielding layer is formed corresponding to the coloring layer of blue that is the complementary color of yellow, a white color can be displayed with desired white balance close to natural white. That is, it is possible to provide a liquid crystal device capable of providing aesthetically appealing images.

In the above liquid crystal device, it is preferable that the second substrate has a light-shielding portion made of resin for partitioning the coloring layer of one color from that of another color, and the aperture in the electrostatic shielding layer is formed in such a manner that the region of the aperture partially overlaps the light-shielding portion in plan view.

In this configuration, the entry of an end of the aperture, in plan view, into the area formed with the coloring layers, causing color non-uniformity, can be suppressed.

In the above liquid crystal device, it is preferable that the second substrate has an overcoating layer that covers the color filter, and the electrostatic shielding layer is disposed between the substrate surface and the overcoating layer.

In this configuration, at least the overcoating layer and the liquid crystal layer are interposed between the electrostatic shielding layer on the second substrate and the first and second electrodes on the first substrate. Therefore, with respect to the longitudinal electric field between the electrostatic shielding layer and the first electrode or the second electrode generated when a transverse electric field is generated between the first electrode and the second electrode, the intensity thereof can be reduced. That is, a decrease in transmittance due to the longitudinal electric field is suppressed, whereby excellent optical properties can be achieved.

In the above liquid crystal device, it is further preferable that the electrostatic shielding layer is disposed between the color filter and the overcoating layer.

This configuration allows the electrostatic shielding layer to suppress the diffusion of impurities from the resin coloring layers or the light-shielding portion into the liquid crystal layer.

In the above liquid crystal device, it is preferable that the overcoating layer has a thickness of 1 μm to 5

This configuration allows the overcoating layer to serve as a planarization layer of the color filter. Also, the light transmittance can be maintained, making it possible to provide a liquid crystal device capable of providing aesthetically appealing images.

In the above liquid crystal device, it is preferable that the electrostatic shielding layer has a thickness of 20 nm to 200 nm.

This configuration provides a liquid crystal device that allows for a desired color representation even when light transmitted through the liquid crystal layer transmits the electrostatic shielding layer and the coloring layers, while ensuring the antistatic functions.

Another embodiment is directed to an electronic apparatus including the above-mentioned liquid crystal device.

This configuration provides an electronic apparatus, which rarely suffers from a non-uniform display due to static electricity and can display information such as image which can be presented aesthetically and in an identifiable state.

Additional features and advantages are described herein, and will be apparent from the following Detailed Description and the figures.

DETAILED DESCRIPTION

Specific embodiments of the application will be explained hereinafter with reference to the drawings. In the drawings, the components to be described are suitably enlarged or reduced so as to be recognizable.

First Embodiment

Liquid Crystal Device

Figure 1A:
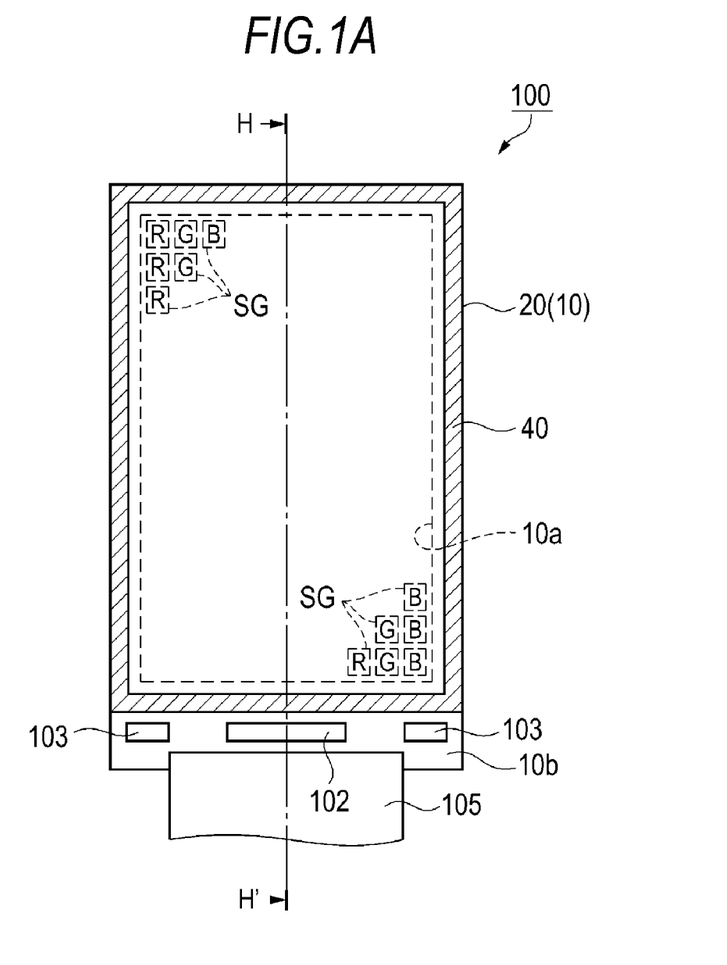
FIG. 1A is a schematic front view showing the configuration of a liquid crystal device.
Figure 1B:
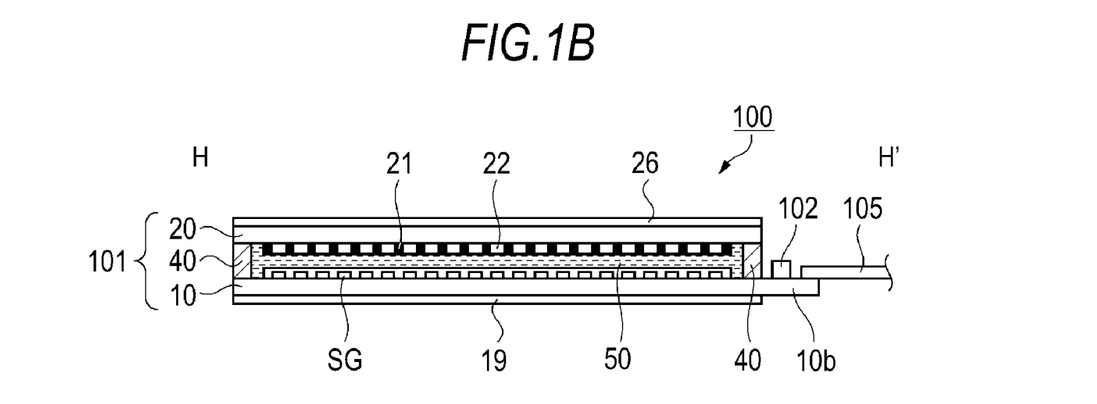
FIG. 1B is a schematic cross-sectional view taken along the line H-H' of FIG. 1A.
Figure 2:
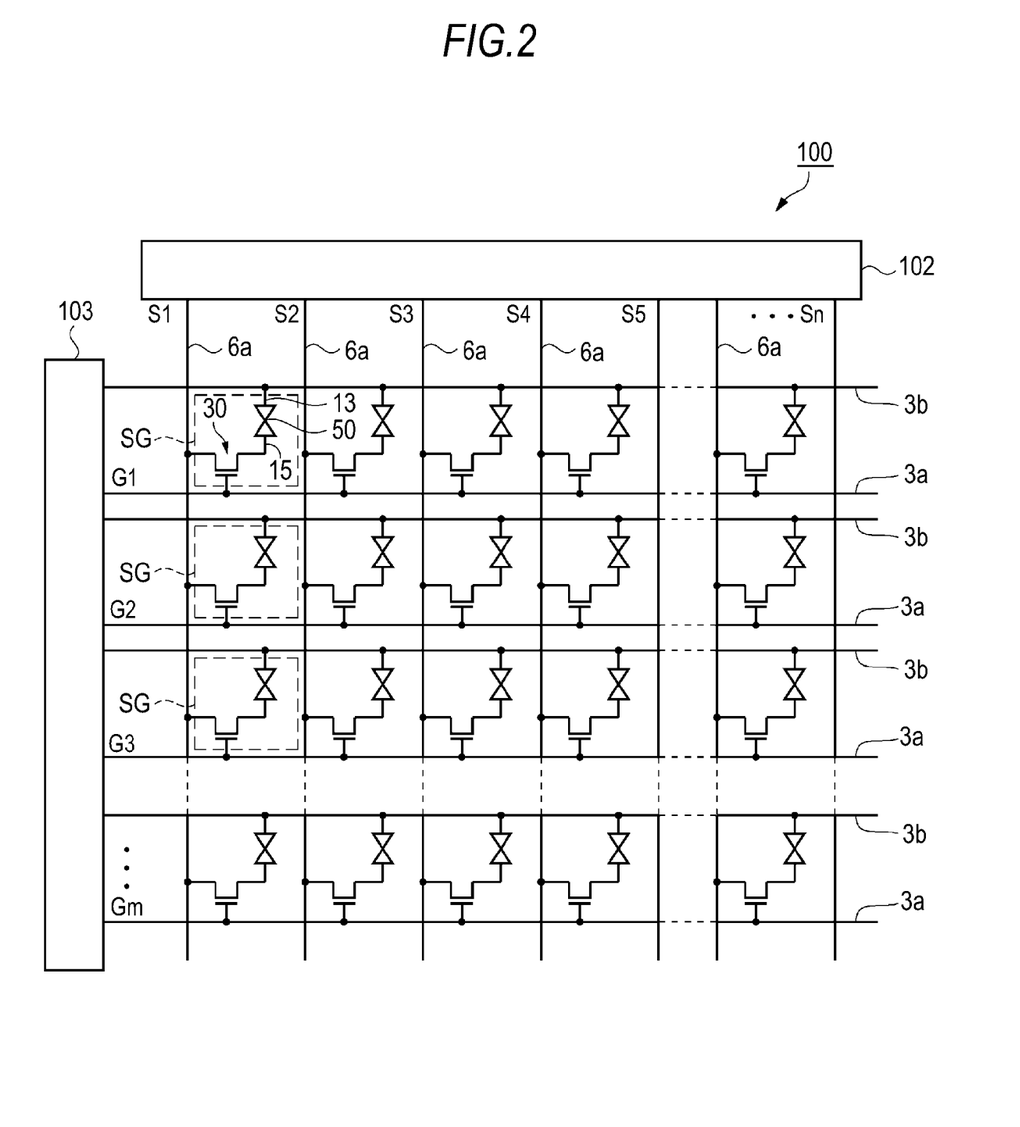
FIG. 2 is an equivalent circuit schematic showing the electrical configuration of a liquid crystal device.
Figure 3:
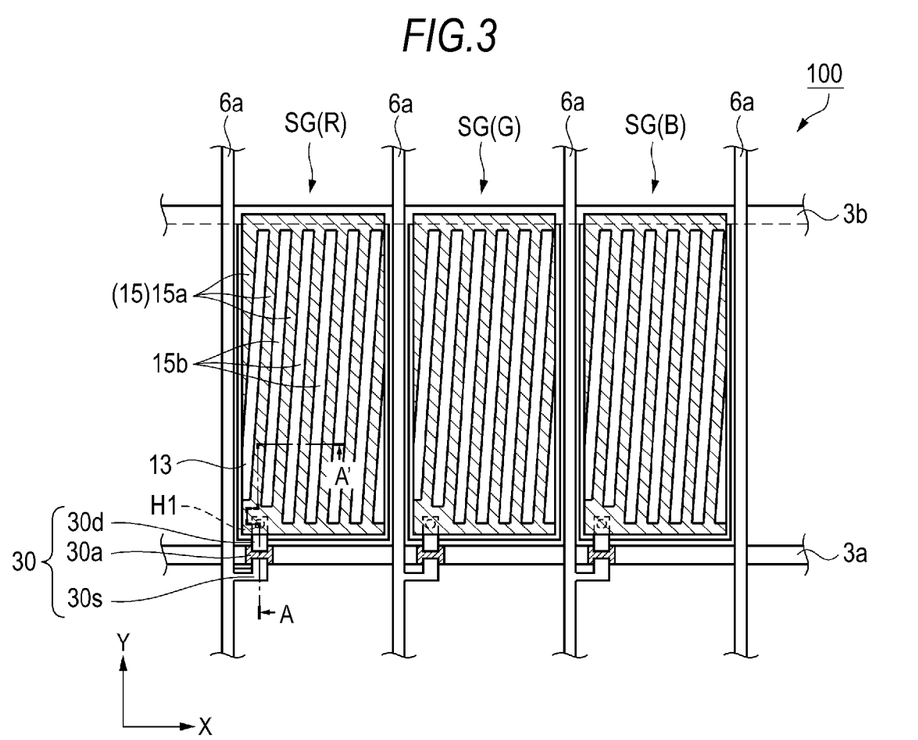
FIG. 3 is a schematic plan view showing the configuration of a pixel.
Figure 4:
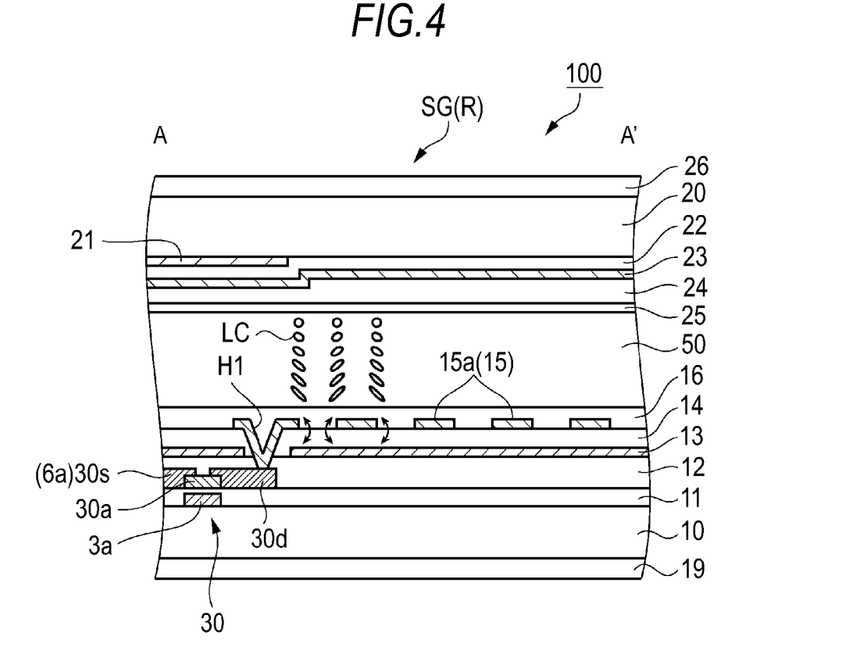
FIG. 4 shows a main partial cross-sectional view of a pixel taken along the line A-A' line of FIG. 3.
Figure 5A:
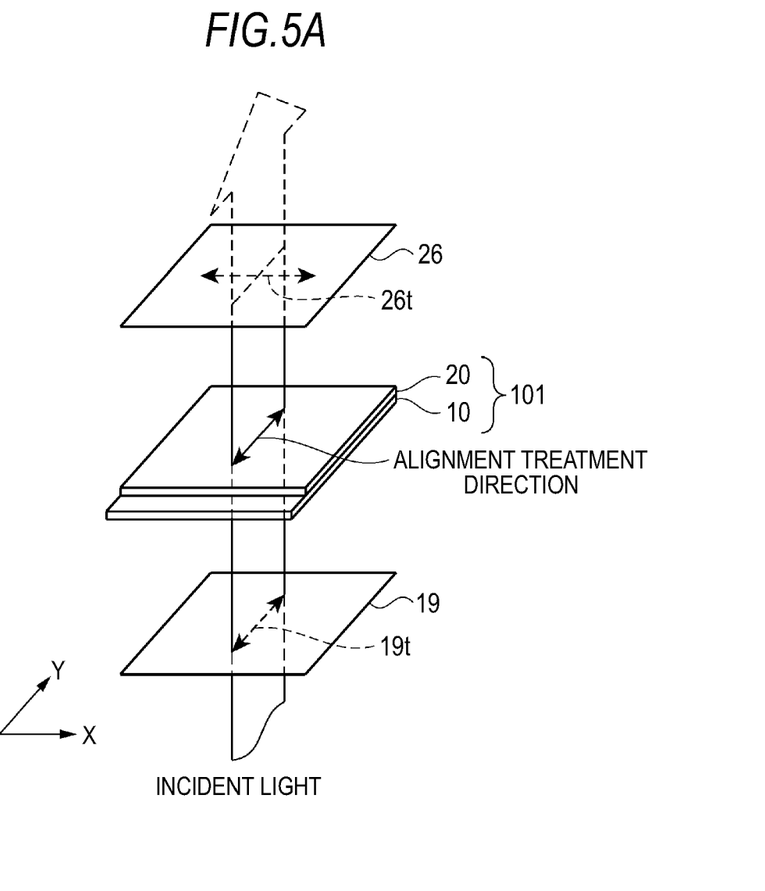
FIGS. 5A and 5B are schematic diagrams showing the optical design requirements of a liquid crystal device.
Figure 5B:
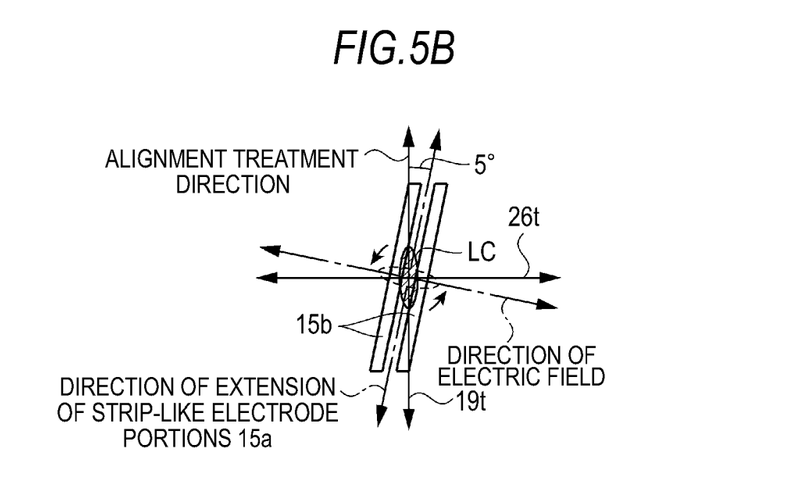
Figure 6:
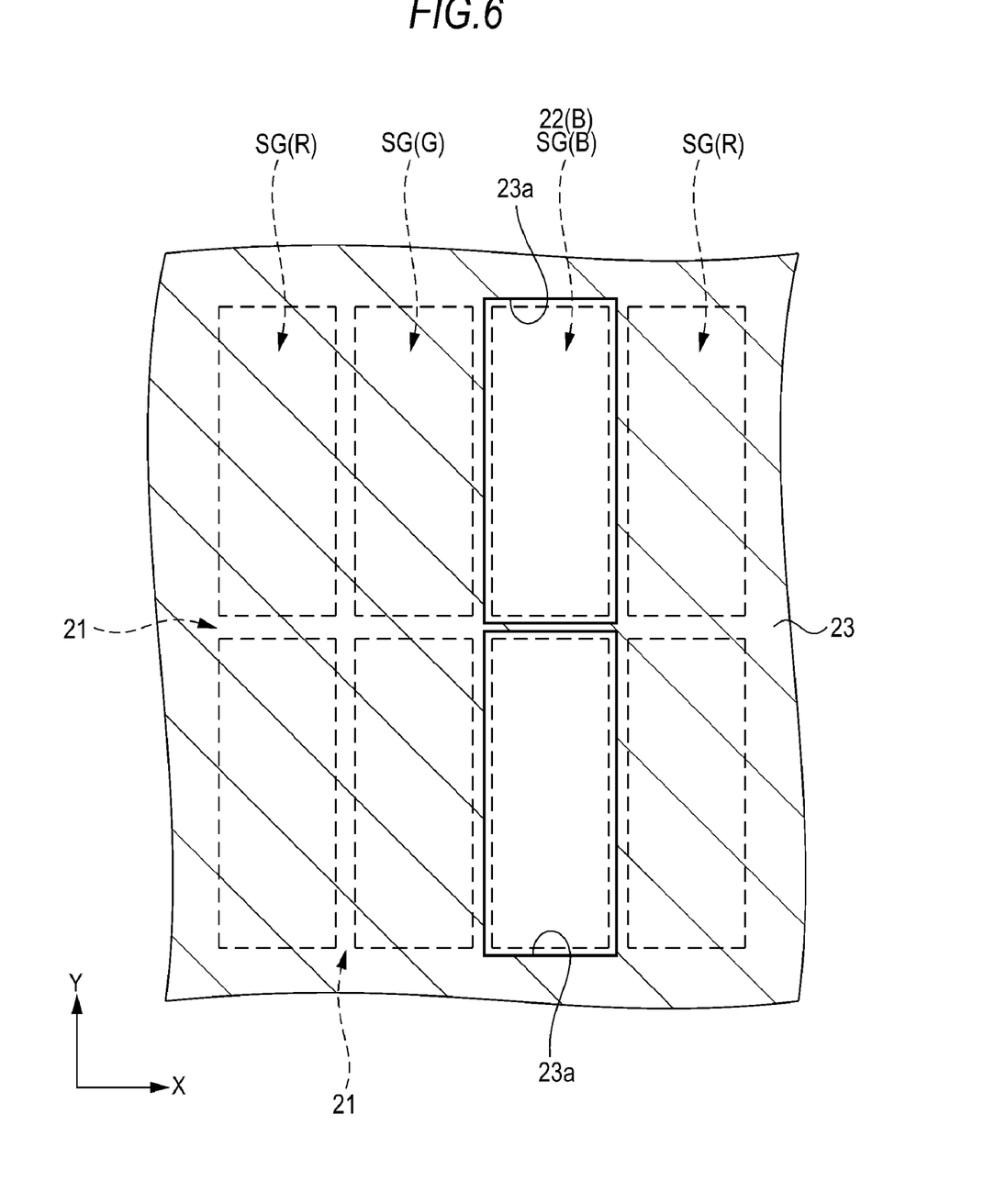
FIG. 6 is a schematic plan view showing the configuration of a shield electrode.

A liquid crystal device according to this embodiment will be described with reference to FIGS. 1A and 1B, FIG. 2, FIG. 3, FIG. 4, FIGS. 5A and 5B, and FIG. 6. FIG. 1A is a schematic front view showing the configuration of the liquid crystal device, and FIG. 1B is a schematic cross-sectional view taken along the line H-H' of FIG. 1A. FIG. 2 is an equivalent circuit schematic showing the electrical configuration of the liquid crystal device. FIG. 3 is a schematic plan view showing the configuration of a pixel. FIG. 4 shows a main partial cross-sectional view of a pixel taken along the line A-A' line of FIG. 3. FIGS. 5A and 5B are schematic diagrams showing the optical design requirements of the liquid crystal device. FIG. 6 is a schematic plan view showing the configuration of a shield electrode.

As shown in FIGS. 1A and 1B, the liquid crystal device 100 according to this embodiment includes, as a pair of substrates, an element substrate 10 and a counter substrate 20. The element substrate 10 as a first substrate and the counter substrate 20 as a second substrate are disposed in predetermined positions and are opposed to each other at a fixed interval. The element substrate 10 and the counter substrate 20 sandwich therebetween a liquid crystal layer 50 in which liquid crystals with positive dielectric anisotropy are filled in a space sealed by a sealant 40. The combination of the element substrate 10, the counter substrate 20, and the liquid crystal layer 50 sandwiched therebetween is called a liquid crystal cell 101.

The area inside the frame-like sealant 40 provided along the sides of the counter substrate 20 serves as a display area 10a. A plurality of display pixels are disposed in the display area 10a, where sub pixels SG corresponding to red (R), green (G), and blue (B), respectively, serve as one display control unit.

The sub pixels SG corresponding to the three colors are arranged in such a manner that sub pixels SG of the same color are disposed in the length direction of the rectangular liquid crystal cell 101, while sub pixels of different colors are arranged in the width direction orthogonal to the length direction; i.e., they are arranged in the form of "stripes".

The element substrate 10 is a transparent glass substrate, for example, and has on its side facing the liquid crystal layer 50 a plurality of sub pixels SG and thin film transistors for driving/controlling the sub pixels SG.

The counter substrate 20 is also a transparent glass substrate, for example, and has on its side facing the liquid crystal layer 50 a color filter 22 and a light-shielding portion 21. The color filter 22 includes filters (coloring layers) of different colors.

The light-shielding portion 21 is made of a material with light-blocking effects, such as a resin material, and is provided to divide the color filter 22 into filters of different colors. The light-shielding portion 21 is also called black matrix (BM).

On the surface of the element substrate 10 opposite from the side facing the liquid crystal layer 50, a polarizing plate 19 is provided as a polarizing element. Likewise, on the surface of the element substrate 20 opposite from the side facing the liquid crystal layer 50, a polarizing plate 26 is provided as a polarizing element. The polarizing plates 19 and 26 are not limited to simple polarizing plates, and may each be combined with an optical film such as a retardation film or may have anti-glare coating or hard coating, for example, applied to the light entry or light exit surface thereof.

The element substrate 10 has a terminal portion 10b projecting from the near side of the counter substrate 20. The terminal portion 10b has thereon drivers ICs 102 and 103 that are semiconductor devices for driving the liquid crystal device 100.

The driver IC 102 has a data line driving circuit, and the driver IC 103 has a scanning line driving circuit.

The driver IC 102 is plane-mounted on the terminal portion 10b in its approximate center in the width direction of the liquid crystal cell 101, while the driver IC 103 is plane-mounted near each end of the terminal portion 10b. The terminal portion 10b also has an interconnect substrate 105 for making a connection with an external drive circuit. The interconnect substrate 105 is a flexible printed circuit (FPC), for example, and is sometimes referred to as an FPC 105.

Such a liquid crystal device 100 is a so-called actively driven, transmissive liquid crystal device. When used, the liquid crystal device 100 is illuminated, for example, by an illumination device (not illustrated) having a light source such as a light-emitting diode (LED) or electroluminescence (EL).

As shown in FIG. 2, the liquid crystal device 100 has a plurality of data lines 6a connected to the driver IC 102 having a data line driving circuit and a plurality of scanning lines 3a and common lines 3b connected to the driver IC 103 having a scanning line driving circuit. The data lines 6a and the scanning lines 3a intersect each other in an insulating manner, and the sub pixels SG are disposed in the areas defined by the data lines 6a and the scanning lines 3a.

Each display pixel SG includes a common electrode 13 as a first electrode, a pixel electrode 15 as a second electrode, and a thin film transistor 30 that serves as a switching device. The gate of the thin film transistor 30 is connected to a scanning line 3a, the source is connected to a data line 6a, and the drain is connected to the pixel electrode 15. The common electrode 13 is connected to a common line 3b.

The driver IC 102 supplies image signals S1, S2, . . . , and Sn to respective sub pixels SG through the data lines 6a. The image signals S1 to Sn may be supplied in this order in a line sequential manner, and may alternatively be supplied to a plurality of adjacent data lines 6a in groups.

The driver IC 103 supplies scanning signals G1, G2, . . . , and Gm to the scanning lines 3a in a pulsed manner at predetermined timings. The scanning signals G1, G2, . . . , and Gm are applied in this order to the gates of the thin film transistors 30 in a line sequential manner.

By the input of the scanning signals G1, G2, . . . , and Gm to turn on the thin film transistors 30 as switching devices, for a given period of time, the image signals S1, S2, . . . , and Sn supplied from the data lines 6a are written in the pixel electrodes 15 at predetermined timings. The image signals S1, S2, . . . , and Sn of predetermined levels written in the liquid crystal layer 50 through the pixel electrodes 15 are each retained for a given period of time between the pixel electrode 15 and the common electrode 13 opposed thereto via the liquid crystal layer 50.

That is, the electric field generated between the common electrode 13 and the pixel electrode 15 drives/controls the liquid crystal layer 50, and the sub pixel SG performs display based on the image signal.

Hereinafter, the thin film transistor is called TFT (Thin Film Transistor) and is referred to as TFT 30.

Next, the configuration of the sub pixels SG will be described in further detail. As shown in FIG. 3, in each of the pixel areas defined by the data lines 6a and the scanning lines 3a, a sub pixel SG has a pixel electrode 15 that is substantially rectangular in plan view. Further, a common electrode 13 is disposed in a position overlapping the pixel electrode 15 in plan view.

Near each of the intersections of the data lines 6a and the scanning lines 3a, a TFT 30 is disposed on the scanning line 3a.

The pixel electrode 15 is formed of a transparent conductive film, such as ITO (Indium Tin Oxide), for example, and has a plurality of strip-like electrode portions 15a that extend in the length direction of the pixel area and are spaced at predetermined intervals in the width direction. Between the strip-like electrode portions 15a there are slit-like spaces, which are hereinafter referred to as slits 15b. The strip-like electrode portions 15a (or slits 15b) are slightly inclined in the direction crossing the direction of extension of the data lines 6a.

The pixel electrode 15 including such strip-like electrode portions 15a is electrically connected through a contact hole H1 to a drain electrode 30d that extends from above a semiconductor layer 30a of the TFT 30 toward the inside of the pixel area.

The common electrode 13 is formed of a transparent conductive film, such as ITO, for example. The common electrode 13 is planar and provided across the length of the pixel area, and one lengthwise end thereof is electrically connected to the common line 3b at a portion overlapping the common line 3b in plan view.

Such sub pixels SG are disposed on the element substrate 10. The sub pixels SG correspond to the filters of three colors, red (R), green (G), and blue (B), on the counter substrate 20, respectively, and have the same configuration.

Next, taking a sub pixel SG(R) as an example, the structure of a sub pixel SG will be described in further detail with reference to FIG. 4. As shown in FIG. 4, first, an electrically conductive layer made of a low-resistance interconnect material such as aluminum is formed on the element substrate 10 by sputtering or vacuum deposition, and the formed electrically conductive layer is then patterned by photolithography to form a scanning line 3a. A gate insulating film 11 made of SiO$_2$ (silicon oxide), for example, is formed to cover the scanning line 3a.

An amorphous silicon layer is formed on the gate insulating film 11 and patterned by photolithography to form a semiconductor layer 30a in the form of an island in a position overlapping the scanning line 3a.

An electrically conductive layer is formed to cover the semiconductor layer 30a and is patterned by photolithography, thereby integrally forming a source electrode 30s, which overlaps the source region of the semiconductor layer 30a, and a data line 6a, which is connected to the source electrode 30s. A drain electrode 30d is also formed to overlap the drain region of the semiconductor layer 30a.

A first interlayer insulating film 12 made of SiN (silicon nitride), for example, is formed to cover the semiconductor layer 30a, the drain electrode 30d, and the source electrode 30s (data line 6a).

An electrically conductive layer is formed on the first interlayer insulating film 12 and patterned by photolithography to form a common line 3b (not illustrated). A transparent conductive film is formed to cover the common line 3b and then similarly patterned by photolithography to form a common electrode 13.

A second interlayer insulating film 14 made of an acrylic resin material, for example, is then formed to cover the common electrode 13. Further, portions of the first interlayer insulating film 12 and the second interlayer insulating film 14 are etched away to form a hole that reaches the drain electrode 30d extending into the pixel area. On the second interlayer insulating film 14, a transparent conductive film is formed to cover the hole, and then patterned by photolithography to form a contact hole H1 and a pixel electrode 15 connected thereto. The pixel electrode 15 is configured to include a plurality of strip-like electrode portions 15a.

An alignment film 16 made of polyimide resin, for example, is formed to cover the pixel electrode 15. The alignment film 16 is subjected to an alignment treatment, such as rubbing, so as to align liquid crystal molecules LC in a predetermined direction.

On the side of the counter substrate 20 facing the liquid crystal layer 50, first, a light-shielding portion 21 is formed using a resin material having light-shielding properties. The light-shielding portion 21 may be formed by a method in which the resin material is applied thereto by a printing method such as a off-set printing, followed by patterning, or in which the resin material with photosensitivity is applied to the entire surface, followed by patterning by light exposure and development.

Next, a photosensitive filter material is applied thereto to cover the light-shielding portion 21, and then exposed to light and developed to form a color filter 22. Needless to say, the color filter 22 is separately formed by each of the colors R, G, and B. Such a color filter 22 may be formed by a droplet discharging method (ink-jet printing) including forming the light-shielding portion 21 made of a resin material as a partition portion, discharging droplets of a fluid substance containing a filter material into an area defined by the light-shielding portion 21, and drying the same to form the color filter 22 with each color.

A shield electrode 23 as an electrostatic shielding layer formed of a transparent conductive film is then formed to cover the color filter 22. An overcoating (OVC) layer 24 is formed using, for example, a transparent acrylic resin to cover the shield electrode 23. Further, an alignment film 25 made of polyimide resin, for example, is formed to cover the overcoating layer 24. The alignment film 25 is, as in the case of the alignment film 16 on the element-substrate-10 side, subjected to an alignment treatment, such as rubbing, so as to align the liquid crystal molecules LC in a predetermined direction.

The thus-configured liquid crystal device 100 works as follows. In the sub pixel SG(R), an electric field generated between the pixel electrode 15 having the strip-like electrode portions 15a and the common electrode 13 controls the alignment direction of liquid crystal molecules LC in the liquid crystal layer 50 to perform display. Such a liquid crystal device is called a FFS (Fringe Field Switching) mode liquid crystal device.

The following describes the optical design of the liquid crystal device 100. As shown in FIG. 5A, the initial alignment of the liquid crystal cell 101 is homogeneous alignment along the pixel column direction, i.e., the direction Y. More specifically, the rubbing direction of the alignment film 16 of the element substrate 10 and the rubbing direction of the alignment film 25 of the counter substrate 20 are both along the direction Y but are oriented at 180° to each other.

Optically, the pair of polarizing plates 19 and 26 are arranged in a crossed Nicols fashion (in such a state that the transmission axes or absorption axes thereof are orthogonal to each other) with the liquid crystal cell 101 therebetween. Specifically, the transmission axis 19t of the polarizing plate 19 on the side where light from an illumination device is incident is in the same direction as the above-mentioned initial alignment direction. In contrast, the transmission axis 26t of the polarizing plate 26 on the side where light exits is in the direction orthogonal to the above-mentioned initial alignment direction.

That is, the incident light is transmitted through the polarizing plate 19 and thus converted into linearly polarized light, and is transmitted through the liquid crystal cell 101. However, the light is then absorbed by the polarizing plate 26, and, therefore, a black display is presented in the undriven state, i.e., the initial alignment state.

As shown in FIG. 5B, the slits 15b of the pixel electrode 15 of the sub pixel SG are inclined at an angle of 5° toward the lower left (85° toward the upper right) with respect to the alignment treatment direction. Therefore, as a result of application of a driving voltage between the pixel electrode 15 having the strip-like electrode portions 15a and the common electrode 13 opposed thereto, an electric field is generated in the direction orthogonal, in plan view, to the direction of extension of the strip-like electrode portions 15a (or slits 15b).

Liquid crystal molecules LC with positive dielectric anisotropy are aligned so that the major axis is in the electric field direction. Therefore, the liquid crystal molecules LC are twisted counter-clockwise in the vicinity of the strip-like electrode portions 15a. As a result, optical rotation occurs in the liquid crystal layer 50 (see FIG. 4). The incident light converted into linearly polarized light by the polarizing plate 19 rotates while passing through the liquid crystal cell 101, and then passes through the polarizing plate 26. That is, in the driven state, the color given by the color filter 22 is observed, and when the different color sub pixels SG forming a display pixel are all in the driven state, a white display is presented. Such a display mode is called "normally black mode".

The angle made by the alignment treatment direction and the strip-like electrode portions 15a (or slits 15b) is not limited to 5°. It is set at such an angle that the liquid crystal molecules LC are stably twisted in a fixed direction when an electric field is generated.

In such a liquid crystal device 100, as described in Patent Document 1, for example, the shield electrode 23 disposed on the counter-substrate-20 side has a construction in which the same potential as that in the common line 3b, i.e., as in the common electrode 13, or a constant potential such as an earth potential or a logic potential is given. As a result, the counter substrate 20 is less prone to the static charge.

Meanwhile, when an electric field is generated between the pixel electrode 15 and the common electrode 13 disposed on the device-substrate-10 side to drive the liquid crystal layer 50, there is a possibility that an electric field may also be generated between the pixel electrode 15 and the shield electrode 23 opposed thereto. The former electric field is substantially parallel to the substrate surface of the device substrate 10, and thus is called a transverse electric field, whereas the latter electric field is called a longitudinal electric field.

In the FFS mode liquid crystal device 100, as mentioned above, liquid crystal molecules LC aligned substantially parallel to the substrate surface by the transverse electric field are twisted to produce optical rotation in the liquid crystal layer 50. Because the generation of a longitudinal electric field encourages the liquid crystal molecules LC to align in the thickness direction in which the optical rotation in the liquid crystal layer 50 is impaired, this results in a reduction in light transmittance in the liquid crystal device 100.

In this embodiment, on the counter substrate 20, the shield electrode 23 is disposed between the color filter 22 and the OVC layer 24 to keep the shield electrode 23 away from the liquid crystal layer 50, so that the intensity of the longitudinal electric field is not stronger than that of the transverse electric field (see FIG. 4).

Further, as shown in FIG. 6, the shield electrode 23 has apertures 23a corresponding to blue sub pixels SG(B), of the different color sub pixels SG(R), SG(G), and SG(B) arranged in the form of stripes in the directions X and Y.

Such an aperture 23a is provided for each sub pixel SG(B), and has an area larger than the pixel area of the sub pixel SG(B). The apertures 23a are formed in such a manner that the aperture area partially overlaps the light-shielding portion 21 that practically defines the pixel areas of the sub pixels SG(B).

Such an arrangement of the shield electrode 23 in plan view is to prevent light transmitted through a color filter of blue 22 from being further transmitted through the shield electrode 23. Otherwise some of the light is allowed to be absorbed by the shield electrode 23, resulting in a decrease in the transmittance or changes in the hue. Further, a longitudinal electric field is rarely generated in blue sub pixels SG (B). That is, a decrease in the transmittance due to the longitudinal electric field is also suppressed. As a result, the transmittance and the hue of the blue light, the complementary color of yellow, are ensured, and, therefore, the white balance is adjusted so that the white display looks more like white, achieving the liquid crystal device 100 capable of providing aesthetically appealing images.

Further, in consideration of the positional accuracy for attaching the device substrate 10 and the counter substrate 20 together using a sealant 40, the apertures 23a are each provided with an area larger than the pixel area of a sub pixel SG(B). Therefore, the blue filter 22 opposed to the sub pixel SG(B) can be reliably opened.

In the liquid crystal device 100, sub pixels SG of the same color are arranged in the direction Y, and, therefore, it seems possible that an aperture 23a is provided across a plurality of sub pixels SG(B); however, such a configuration causes an increase in the planar resistance of the shield electrode 23, resulting in a decrease in antistatic effects. In this first embodiment, in order to avoid a significant decrease in antistatic effects due to the provision of the apertures 23a, one aperture 23a is provided for a single sub pixel SG(B).

The apertures 23a are not limited to being provided corresponding only to the sub pixels SG(B). For example, in consideration of the white balance of the liquid crystal device 100, the apertures 23a may be provided corresponding not only to sub pixels SG(B) but also to red sub pixels SG(R).

Figure 7:
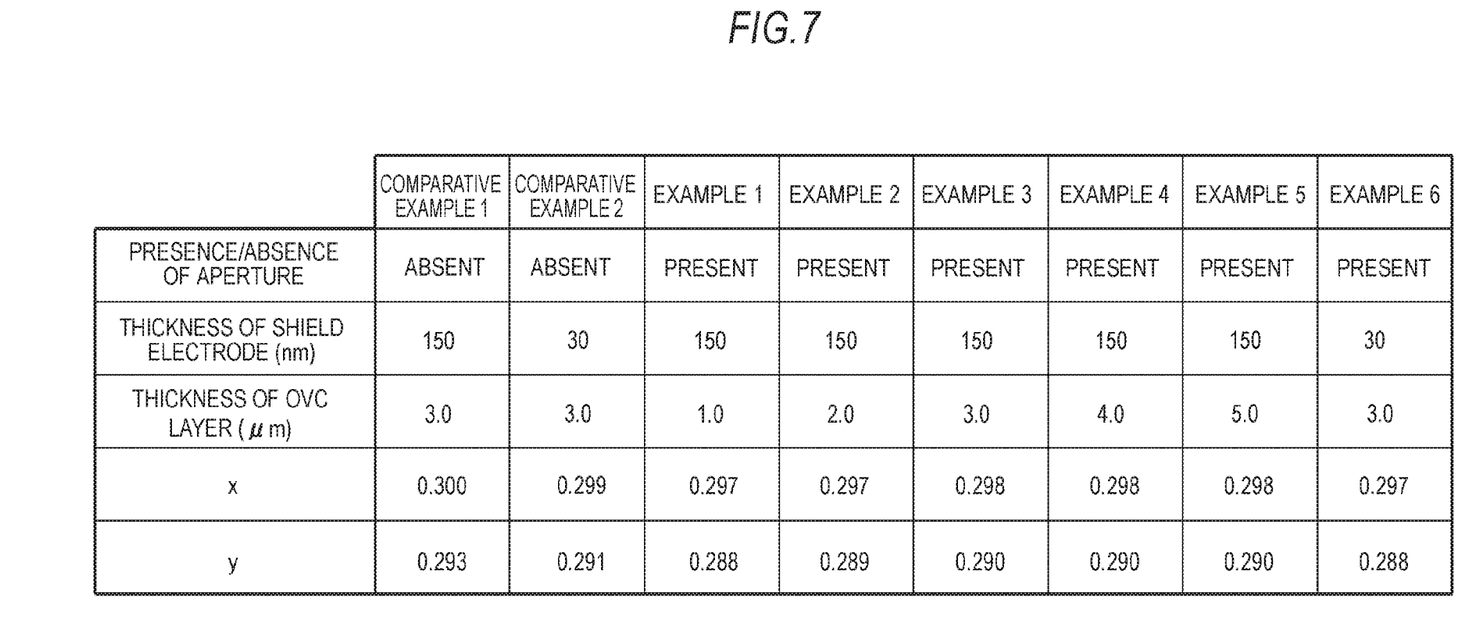
FIG. 7 is a table showing the configurations of shield electrodes and OVC layers in Comparative Examples and Examples.
Figure 8:
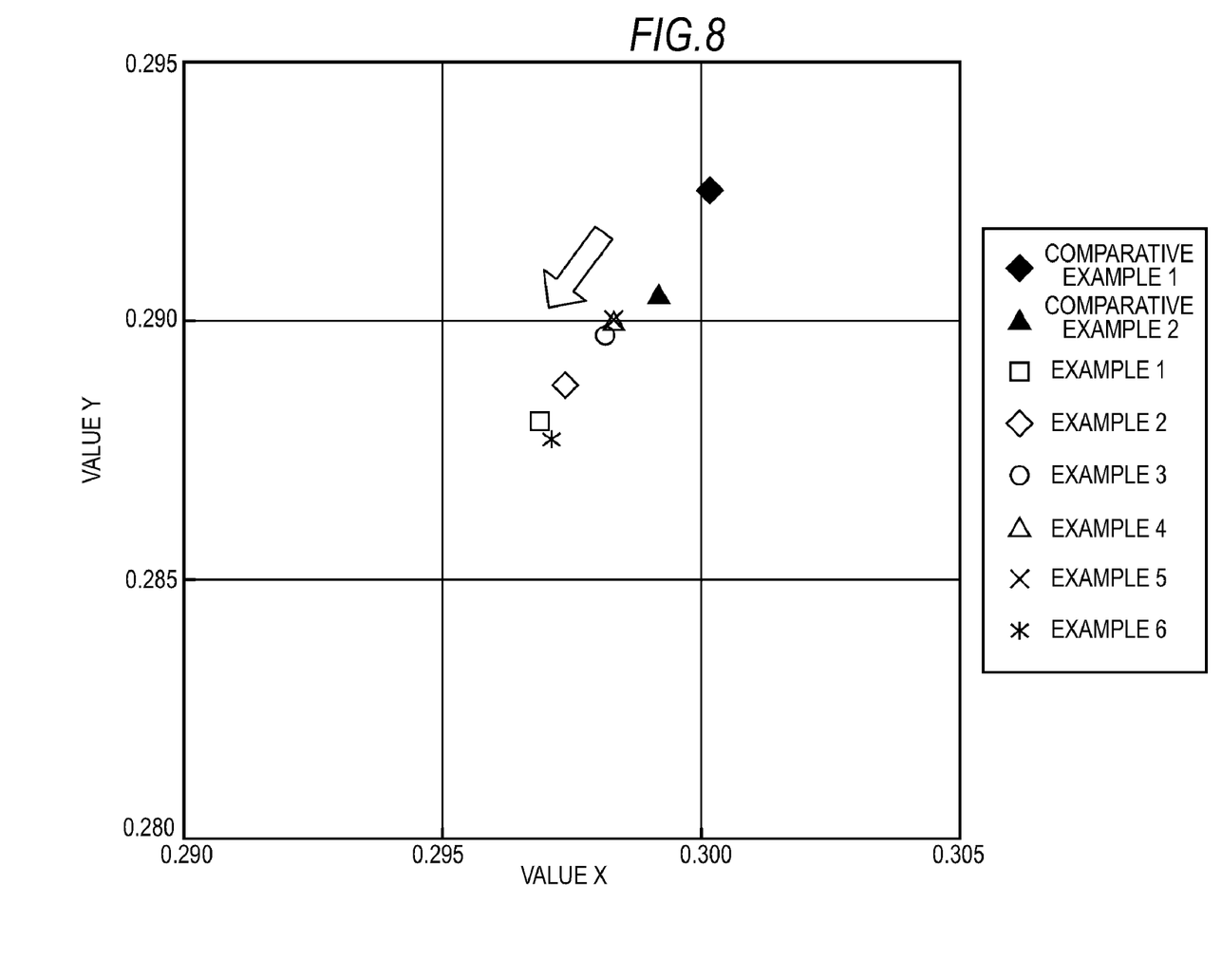
FIG. 8 is a CIE xy chromaticity diagram of Comparative Examples and Examples.

The following are Comparative Examples and Examples. FIG. 7 is a table showing the configurations of shield electrodes and OVC layers in Comparative Examples and Examples. FIG. 8 is a CIE xy chromaticity diagram of Comparative Examples and Examples. The CIE xy chromaticity diagram of FIG. 8 was obtained from optical simulation and the production conditions of liquid crystal devices 100 of the following Comparative Examples and Examples.

In each of Comparative Example 1, Comparative Example 2, and Examples 1 to 6, a liquid crystal layer 50 in the liquid crystal device 100 includes liquid crystals with positive dielectric anisotropy, and has a double refractive index Δn of 0.12 to 0.15, a dielectric constant Δ∈ of 8.0 to 16.0, and a thickness of 2.5 μm to 4.0 μm.

In a color filter 22, the thicknesses of filters are almost same, and are about 1μ to about 2.5 μm.

An ITO film formed as a transparent conductive film by sputtering or vacuum deposition is used as a shield electrode 23.

An OVC layer 24 is made of a transparent acrylic resin, and has a dielectric constant at 1 kHz of about 2.5.

As shown in FIG. 7, Examples 1 to 6 employ combinations of the shield electrode 23 and the OVC layer 24 on the counter-substrate-20 side formed under different conditions.

Specifically, in Examples 1 to 5, the thickness of the shield electrode 23 is about 150 nm, and the thickness of the OVC layer 24 varies from 1.0μ to 5.0 μm. In Example 6, the thickness of the OVC layer 24 is about 3.0 μm, the median of the above-mentioned range of variation, and the thickness of the shield electrode 23 is 30 nm, thinner than in Examples 1 to 5.

In contrast, in Comparative Example 1 and Comparative Example 2, the liquid crystal device 100 is configured to have a shield electrode 23 and no apertures 23a. The thickness of the OVC layer 24 in each case is 3.0 μm. The thickness of the shield electrode 23 is 150 nm in Comparative Example 1 and 30 nm in Comparative Example 2.

As shown in the CIE xy chromaticity diagram of FIG. 8 and also by the x coordinate values and y coordinate values of Comparative Example 1, Comparative Example 2, and Examples 1 to 6 given in FIG. 7, the provision of the apertures 23a in the shield electrode 23 corresponding to blue sub pixels SG(B) advantageously shifts the hue displayed by the liquid crystal device 100 in the direction indicated by the arrow, i.e., toward blue, as compared with Comparative Example 1 and Comparative Example 2.

Comparing 4.0 μm of Example 4 and 5.0 μm of Example 5, the x and y coordinate values are nearly the same, and also they are close to the x and y coordinate values of Comparative Example 2. From this, the appropriate upper limit on the thickness of the OVC layer 24 expected to cause a shift of the hue toward blue is about 5.0 μm. In other words, when the thickness of the OVC layer 24 exceeds 5.0 μm, the provision of apertures 23a in the shield electrode 23 will have no advantage.

Meanwhile, the thinner the OVC layer 24 is, the more it is likely that the hue is advantageously shifted toward blue. However, when the OVC layer 24 is too thin, this degrades the function of the OVC layer 24 as a planarization layer or eliminates the advantage of disposing the shield electrode 23 between the color filters 22 and the OVC layer 24, i.e., a reduction in the intensity of a longitudinal electric field. Therefore, the appropriate lower limit is about 1.0 μm. That is, the thickness of the OVC layer 24 is preferably 1.0 μm to 5.0 μm. In order to balance the above-mentioned advantages, the thickness is more preferably 2.0 μm to 4.0 μm.

Regarding the thickness of the shield electrode 23, with reference to results for the x and y coordinate values obtained from the chromaticity diagrams of Comparative Example 1, Comparative Example 2, and Examples 1 to 6 shown, the thinner the shield electrode 23 is, the more the hue is advantageously shifted toward blue. However, for example, from the facts that an electrical resistance that practically provide antistatic effects is provided by the shield electrode 23, and that in the case where an ITO film having a refractive index n of about 1.7 is used as a transparent conductive film, when the thickness thereof exceeds 200 nm, the shield electrode 23 itself is likely to absorb longer-wavelength light in the visible light region and thus has a reddish hue, the thickness of the shield electrode 23 is preferably within a range of about 20 nm to about 200 nm.

Further, because the shield electrode 23 is disposed on the counter substrate 20 to cover the color filter 22, for example, in order to reliably cover steps on the surface of the color filter 22 or prevent the diffusion of impurities, such as ion components, from the color filter 22 made of resin into the liquid crystal layer 50, the thickness of the shield electrode 23 is preferably about 50 nm to about 150 nm.

Second Embodiment

Electronic Apparatus

Figure 9:
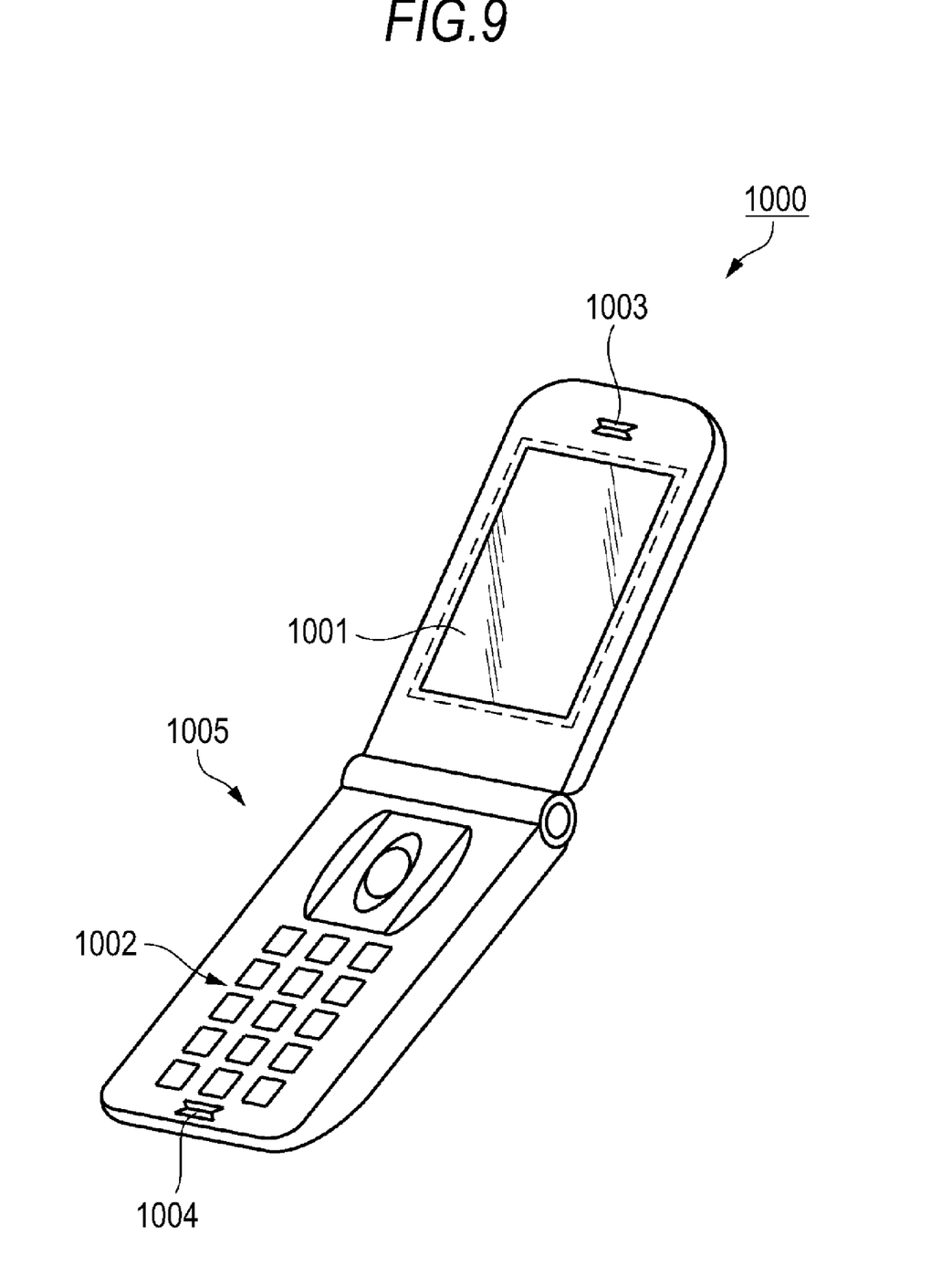
FIG. 9 is a schematic perspective view of a portable phone as an electronic apparatus.

Next, an electronic apparatus according to this embodiment will be described with reference to FIG. 9. FIG. 9 is a schematic perspective view of a portable phone as the electronic apparatus.

As shown in FIG. 9, the portable phone 1000 as the electronic apparatus according to this embodiment has a body portion 1005 including a plurality of operation buttons 1002, an earpiece 1003, a mouthpiece 1004, and a display portion 1001.

The display portion 1001 has mounted thereon the liquid crystal device 100 of the first embodiment.

In the thus-configured portable telephone 1000, the disturbance of display due to the static charge is suppressed, the white balance is adjusted, and the display portion 1001 can produce aesthetically presenting of information such as images.

An electronic apparatus on which the liquid crystal device 100 can be mounted is not limited to the portable phone 1000. For example, the liquid crystal device can be advantageously used as a display portion of a personal computer, a liquid crystal television, a digital still camera, a portable DVD player, a portable navigation system, an electronic notebook, a portable POS terminal, etc.

In addition to the above embodiments, various modifications thereto will be possible. Hereinafter, such variations will be described.

Variation 1

Figure 10A:
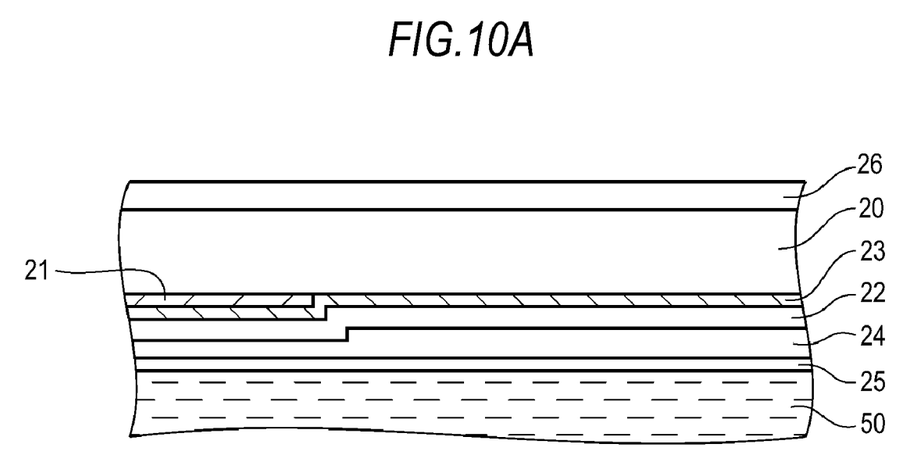
FIGS. 10A and 10B are schematic diagrams each showing the configuration of a counter substrate of a variation.

In the liquid crystal device 100 of the first embodiment, the arrangement of the shield electrode 23 on the counter substrate 20 is not limited to the given example. FIGS. 10A and 10B are schematic diagrams each showing the configuration of a counter substrate of a variation. For example, as shown in FIG. 10A, it is possible to form a shield electrode 23 on the substrate surface of the counter substrate 20 on the side facing the liquid crystal layer 50 so as to cover a light-shielding portion 21 made of resin, and then sequentially form thereon a color filter 22, an OVC layer 24, and an alignment film 25. As a result, the shield electrode 23 can be formed at a greater distance from the liquid crystal layer 50, thereby reducing the intensity of a longitudinal electric field. That is, influences of the longitudinal electric field on the red sub pixels SG(R) and the green sub pixels SG(G) can be reduced, resulting in higher transmittance.

Figure 10B:
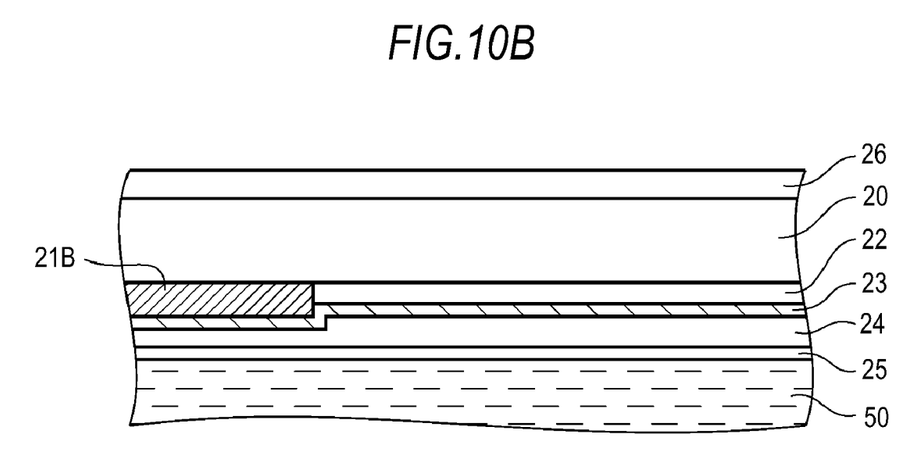

Alternatively, as shown in FIG. 10B, it is also possible to form a light-shielding portion 21B made of resin to have a thickness equal to or greater than that of the color filter 22 to give a partitioning portion (bank). Then, droplets of a fluid substance containing a filter material are applied to an area divided by the light-shielding portion 21B, and then dried to give a filter (coloring layer). Further, a shield electrode 23 is provided to cover the light-shielding portion 21B and the color filter 22. This allows the color filter 22 to be formed at low cost using a droplet discharging method (ink-jet printing) capable of eliminating the waste of the filter material, and it is also possible to suppress the diffusion of impurities from the resin light-shielding portion 21B and the color filter 22 into the liquid crystal layer 50.

Variation 2

In the sub pixels SG of the liquid crystal device 100 of the first embodiment, the FFS electrode structure is not limited to the given example. For example, it is possible that in a sub pixel SG, a planar pixel electrode 15 connected to the TFT 30 is formed, and a common electrode 13 having a plurality of strip-like electrode portions is disposed facing the liquid crystal layer 50 and opposed to the pixel electrode 15 with an insulating layer therebetween. That is, the arrangement of the pixel electrode 15 and the common electrode 13 the liquid crystal layer 50 can be changed.

Variation 3

The electrode structure in the sub pixels SG of the liquid crystal device 100 of the first embodiment is not limited to the FFS electrode structure. For example, even in the IPS (In Plane Switching) electrode structure where both the common electrode 13 and the pixel electrode 15 have strip-like electrode portions in such a manner that the strip-like electrode portions of each electrode are alternately opposed to each other on the same insulating layer, the provision of a shield electrode 23 and apertures 23a on the counter substrate 20 achieves the same effects and advantages.

Variation 4

The sub pixels SG are not limited to those corresponding to three colors, red (R), green (G), and blue (B). For example, the sub pixels SG may also correspond to multiple colors other than the above-mentioned three colors.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A liquid crystal device comprising:
a first substrate;
a second substrate;
a liquid crystal layer sandwiched between the first substrate and the second substrate;
a first electrode and a second electrode disposed on a side of the first substrate facing the liquid crystal layer; and
a color filter and an electrostatic shielding layer disposed on a side of the second substrate facing the liquid crystal layer, the color filter including coloring layers of at least red, green and blue,
the electrostatic shielding layer having an aperture formed therein corresponding only to the blue coloring layer.

2. A liquid crystal device according to claim 1, wherein the second substrate has a light-shielding portion made of resin for partitioning the coloring layer of one color from that of another color, and
the aperture in the electrostatic shielding layer is formed in such a manner that the region of the aperture partially overlaps the light-shielding portion in plan view.

3. The liquid crystal device according to claim 1, wherein the second substrate has an overcoating layer that covers the color filter, and
the electrostatic shielding layer is disposed between a substrate surface of the second substrate and the overcoating layer.

4. A liquid crystal device according to claim 3, wherein the electrostatic shielding layer is disposed between the color filter and the overcoating layer.

5. A liquid crystal device according to claim 3, wherein the overcoating layer has a thickness of 1 μm to 5 μm.

6. A liquid crystal device according to claim 1, wherein the electrostatic shielding layer has a thickness of 20 nm to 200 nm.

7. An electronic apparatus comprising a liquid crystal device according to claim 1.

* * * * *